UNITED STATES PATENT OFFICE.

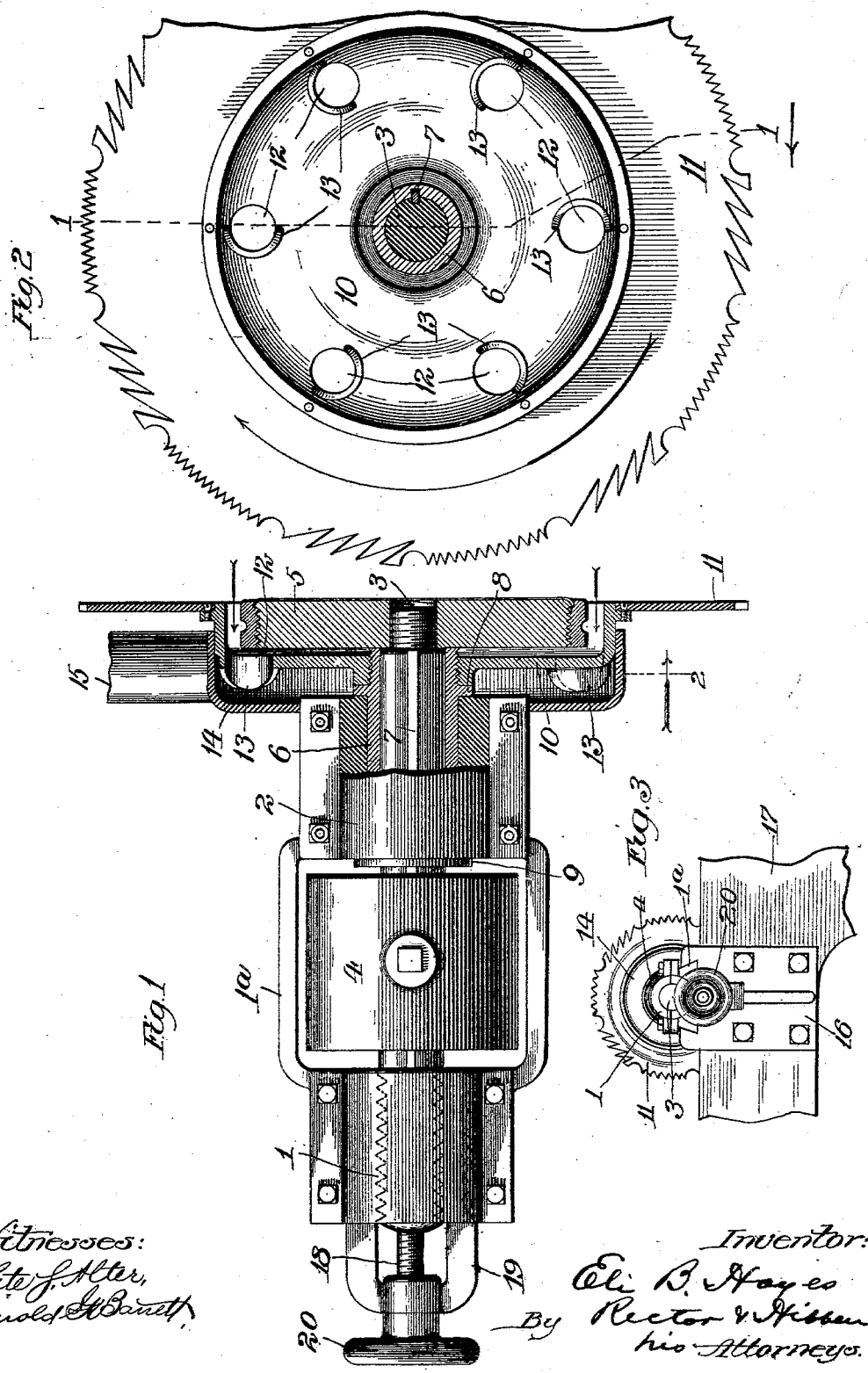

ELI B. HAYES, OF OSHKOSH, WISCONSIN.

SANDING-MACHINE.

SPECIFICATION forming part of Letters Patent No. 715,204, dated December 2, 1902.

Original application filed December 30, 1901, Serial No. 87,754. Divided and this application filed February 28, 1902. Serial No. 96,067. (No model.)

*To all whom it may concern:*

Be it known that I, ELI B. HAYES, a citizen of the United States, residing at Oshkosh, in the county of Winnebago, in the State of Wisconsin, have made a new and useful Improvement in Sanding-Machines, of which the following is a specification.

My invention relates to what are known as "sanding-machines" of the general type and operation as that shown and described in an application filed by me on December 30, 1901, Serial No. 87,754, and of which application the present application is a division.

My present invention herein described and claimed pertains to the jointing-saw and sand-head of a sanding-machine; and the object thereof is to provide a simple and efficient device of this character and one having in its preferred form simple means for collecting and disposing of the dust, &c., resulting from the operations of the saw and sand-head.

In the drawings, Figure 1 is a plan view of my jointing-saw and sand-head with a portion thereof broken away and in section on irregular line 1 1 of Fig. 2 looking in the direction of the arrow, so as to illustrate the arbor and the method of attachment of the saw and sand-head thereto. Fig. 2 is a sectional elevation on the line 2 of Fig. 1; and Fig. 3, an end elevation of the jointing-saw and sand-head, on a reduced scale as compared with the scale of the other figures, and illustrating the device attached to the frame of a sanding-machine.

As herein shown, a frame 1ª is provided with two journal-boxes 1 and 2, in which are mounted the shaft or arbor 3, which causes rotation of the jointing-saw and sand-head. As shown in Fig. 1, this arbor is babbitted at its outer end in the journal-box 1, so as to move rotarily but not longitudinally of such box, and such arbor is driven by a pulley 4. The extreme inner end of the arbor 3 is of reduced diameter and threaded to receive the sand-head 5, on which the sandpaper is applied and secured in the usual well-known manner, which requires no description here. Within the journal-box 2 the arbor 3 is surrounded by a sleeve 6, splined on such arbor, which has a longitudinal key or feather 7, received by a corresponding groove or keyway in the sleeve to the end that the sleeve will rotate with the shaft. The sleeve also has a fixed flange 8 outside the box 2, and at the end adjacent the pulley 4 it has another fixed flange 9.

The inner end of the sleeve 6 just outside the bearing-box 2 is screw-threaded to receive the disk-shaped frame 10, which screws up against the fixed flange 8 and carries the saw 11, screwed, bolted, or otherwise secured to its frame, as may be found desirable or expedient. This saw is illustrated in Figs. 2 and 3 as a combination rip and cut-off saw, which is best adapted for the work to be done.

Referring to Figs. 1 and 2, the saw-frame 10 is provided with a series of holes or openings 12, which are flanged on one side and thus provided with semicircular wings 13. The purpose of this construction of saw-frame is to cause a suction or collection of the dust through such openings in the frame and into a casing 14, from which the dust is discharged through a take-off or delivery pipe 15, leading to any suitable place of discharge. The wings 13 at the sides of the openings 12, in connection with the disk-frame, act as a fan for sucking the dust inward through the annular space between the outer margin of the sand-head and the flanged rim of the saw-frame, as indicated by the arrows in Fig. 1, the saw-frame being capable of receiving the sand-head, so that the outer face or surface of the sand-head will be in the same plane as the outer face or surface of the saw 11.

As shown in Fig. 3, the frame 1ª is adjustable laterally or transversely of the machine in a stationary frame 16, which may be a part of the machine-frame or, as shown in the drawings, a separate piece bolted onto the sanding-machine frame 17. In the present instance the frame 1ª is dovetailed into the stationary frame 16 and is moved by a screw 18 engaging the movable frame 1ª below its arbor 3. This screw rotates freely in the bracket or frame 19 on the stationary frame 16 and is operated by the hand-wheel 20.

The purpose of my jointing-saw and sand-head is to cut off or trim the ends of a sash-rail or the like and also for the purpose of sandpapering the same. Under the construction hereinbefore shown and described not only is a simple and efficient arrangement and construction of the jointing-saw and sand-head provided, but provision is made for the sucking or collecting of the dust resulting from the operations of the sand-head and saw and for discharging the same to a point away from the machine.

I claim—

1. The combination of a jointing-saw and a sand-head, the latter being separated from the saw by an annular space, means for drawing or sucking the dust through such space and driving mechanism for said saw and sand-head; substantially as described.

2. The combination of a jointing-saw and a sand-head, the latter being separated from the saw by an annular space, and means dependent upon the relations of the saw and sand-head for drawing or sucking the dust through such space and driving mechanism for said saw and sand-head; substantially as described.

3. A jointing-saw and sand-head in combination with means dependent upon the rotations of the saw and sand-head for collecting the dust; substantially as described.

4. The combination of a jointing-saw and a sand-head, the latter being separated from the saw by an annular space, and means connected to the saw and dependent upon the rotations of the saw and sand-head for drawing or sucking the dust through such space and driving mechanism for said saw and sand-head; substantially as described.

5. A saw whose body portion constitutes a suction-fan for collecting or sucking the dust resulting from the operation of the saw; substantially as described.

6. A saw whose body portion is provided with a series of openings having fan-blades for creating a suction to suck the dust and a blast to expel it; substantially as described.

7. The combination of a jointing-saw and a sand-head, the latter being separated from the saw by an annular space, the body of the saw constituting a suction-fan and drawing dust through said space, substantially as described.

8. The combination of a jointing-saw and a sand-head, the latter being separated from the saw by an annular space, the body of the saw having a series of openings and fan-blades at the sides of such openings and constituting a suction-fan; substantially as described.

9. A jointing-saw and sand-head device, comprising a rotatable arbor, a sand-head secured thereto, a flanged disk or frame also secured thereto and having openings and a saw supported on the disk, which by reason of its openings acts as a fan; substantially as described.

10. A jointing-saw and sand-head device comprising a rotatable arbor, a sand-head secured thereto, a flanged disk or frame also secured thereto and having openings, a saw supported on the disk, which by reason of its openings acts as a fan, and a casing and pipe coöperating with the sand-head and disk to receive the dust; substantially as described.

11. A jointing-saw and sand-head device arranged thereon and comprising a rotatable arbor, a sand-head secured thereto, a flanged disk or frame also secured thereto and having openings, a saw supported on the disk which by reason of its openings acts as a fan, said openings having flanges acting as blades or wings; substantially as described.

12. A jointing-saw and sand-head device comprising a rotatable arbor, a sand-head secured thereto, a flanged disk or frame also secured thereto and having openings, a saw supported on the disk which by reason of its openings acts as a fan, a space being formed between the margin of the sand-head and the flange of the disk and said openings having semicircular blades or wings to suck the dust through said space; substantially as described.

13. A jointing-saw and sand-head device comprising a rotatable arbor, a sand-head secured thereto and rotated thereby, a disk-shaped saw-frame also rotated thereby and flanged to receive the saw-head, a saw secured to the saw-frame, said arbor being journaled in a frame adjustable and slidable on the machine-frame; substantially as described.

14. In a machine of the class described, the combination of the machine-frame, a bearing-frame adjustable thereon, an arbor journaled in such bearing-frame, a sleeve splined to said arbor, a saw secured to the sleeve and a sand-head secured to the arbor; substantially as described.

15. In a machine of the class described, the combination of the machine-frame, an arbor supported thereby, a sleeve arranged on and rotated by such arbor, a jointing-saw on such sleeve and a saw-head secured to the arbor; substantially as described.

ELI B. HAYES.

Witnesses:
W. B. GERDINE,
R. F. HUNTER.

It is hereby certified that in Letters Patent No. 715,204, granted December 2, 1902, upon the application of Eli B. Hayes, of Oshkosh, Wisconsin, for an improvement in "Sanding Machines," an error appears in the printed specification requiring correction, as follows: In line 18, page 2, the word " relations" should read *rotations;* and that the said Letters Patent should be read with this correction therein that the same may conform to the record of the case in the Patent Office.

Signed and sealed this 16th day of December, A. D., 1902.

[SEAL.]

F. I. ALLEN,
*Commissioner of Patents.*